Patented Apr. 23, 1940

2,197,956

UNITED STATES PATENT OFFICE 2,197,956

VAPOR PHASE DEHYDRATION OF ACETYLENIC ALCOHOLS

Thomas H. Vaughn, Niagara Falls, N. Y., assignor to Union Carbide and Carbon Research Laboratories, Inc., a corporation of New York No Drawing. Application July 20, 1937,
Serial No. 154,565

3 Claims. (Cl. 260—678)

This invention relates to the catalytic dehydration of acetylenic alcohols; and more especially it concerns the production from these alcohols of vinyl acetylene and alkyl vinyl acetylenes—such as the alkenyl and isoalkenyl acetylenes—under conditions inhibiting or minimizing the decomposition and resinification of the said alcohols or of the resultant alkyl vinyl acetylenes.

In its broadest scope, the invention comprises the vapor phase dehydration of an acetylenic alcohol, in the presence of a commercial alumina such as activated alumina which has been treated—i. e., leached or impregnated—with an acidic inorganic compound such as aluminum sulfate, sulfuric acid or phosphoric acid in amount at least sufficient to neutralize any alkalinity possessed by the alumina and to yield an alumina which is neutral or is slightly acidic in reaction. The leached or impregnated alumina may be further purified by washing with water or other suitable solvent until free from water-soluble components.

Efforts have been made in the past to produce isoalkenyl acetylenes by the catalytic dehydration of certain tertiary acetylenic alcohols, employing as catalysts activated alumina, thoria, activated carbon, and aluminum sulfate. The use of these catalysts yielded little or no isoalkenyl acetylenes; and certain of them, such as activated alumina, caused a very active decomposition of the alcohol into acetylene and ketone with no production of the desired isoalkenyl acetylenes.

In accordance with the preferred form of this invention, the vapors of a secondary or tertiary acetylenic carbinol are passed over an activated or other alumina that has been impregnated or leached, and either rendered neutral or slightly acidic, by means of a small proportion of aluminum sulfate. The body of the catalyst is maintained at a temperature within the range from 150° to 450° C.; and temperatures ranging from 200° C. to 350° C. are preferred.

The vapors issuing from the catalyst chamber are condensed; and the condensate is fractionally distilled under either atmospheric or subatmospheric pressure, and the isoalkenyl acetylene is separately condensed and recovered.

The character of the reactions involved in the dehydration is indicated by the following equation:

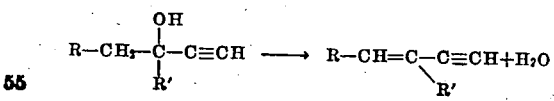

wherein both R and R' respectively designate either an alkyl radical or hydrogen atom.

The following examples serve to illustrate the invention:

EXAMPLE 1

*Preparation of methyl vinyl acetylene*

During 3.75 hours, the vapors of 105 grams of dimethylethynylcarbinol were passed over 250 cc. of dry acidic activated alumina in a catalyst tube maintained in an electrically-heated furnace at temperatures ranging from 200° to 240° C. The vapors issuing from the catalyst tube were quickly condensed, and the condensate was fractionally distilled under atmospheric pressure, yielding 33 grams of methyl vinyl acetylene, isopropenylacetylene, boiling between 32° and 34° C. under atmospheric pressure, corresponding to a yield of 40%, based upon the carbinol treated. The higher fractions remaining consisted almost entirely of unreacted dimethylethynylcarbinol and water; so that the efficiency of the dehydration was almost theoretical.

The acidified activated alumina employed as catalyst was prepared by treating 4 parts of commercial activated alumina containing somewhat less than 1% of sodium oxide, with 2 parts of aluminum sulfate dissolved in 3 parts of boiling water. This mixture was digested at a temperature between 90° and 100° C. for 4 hours. After the digestion, the mixture was decanted to remove excess aluminum sulfate solution, and the acidified alumina was dried at 110° C. for 4 hours prior to use.

By dehydrating dimethylethynylcarbinol in similar manner but using temperatures ranging between 150° and 200° C.—or temperatures between 350° and 450° C.—somewhat lower yields of methyl vinyl acetylene are secured at substantially theoretical efficiencies. At temperatures around 450° C. or above, considerable decomposition of the dimethylethynylcarbinol occurs, forming actylene, acetone, and tars. Optimum yields of the methyl vinyl acetylene are secured in the temperature range between 200° and 350° C. with efficiencies around 100%.

The mixture of water and dimethylethynylcarbinol remaining after separation of the methyl vinyl acetylene may be used without purification as a starting material for further dehydration in the process.

Acidified activated alumina, prepared in the general manner described in Example 1, maintains its efficiency quite well during extended use, though the yields of the isoalkenyl acetylene decrease materially during such use. The acidified activated alumina catalysts also can be reactivated by heating to temperatures around 900° C. for several hours. These reactivated catalysts tend to decompose small amounts of the carbinol into acetone and acetylene.

When the carbinol is passed over fresh acidified activated alumina, substantially no tarry products are formed. In one series of runs, 1900 parts by weight of dimethylethynylcarbinol yielded only 16.5 parts by weight of materials boiling above 115° C. Since the said carbinol used contained traces of mesityl oxide as impurity, it is evident that practically no high boiling materials were produced.

The carbinol to be dehydrated may contain at least several percent of water; and therefore it is possible to employ the residues from the distillation of crude isoalkenyl acetylenes as starting material for the dehydration.

*Example 2*

High temperature activation of the acidified activated alumina catalyst prepared in accordance with Example 1 yields better results than does the same catalyst activated by merely drying at 110° C. A catalyst prepared in the manner described in Example 1 but activated by heating it at 900° C. for several hours was maintained at 250° C. in a glass catalyst tube while passing over it for 13 hours the vapors of dimethylethynylcarbinol at the rate of 240 grams of the carbinol per liter of catalyst per hour. The weight of the catalyst was 741 grams. The vapors leaving the catalyst chamber were treated in the manner described in Example 1, and the methyl vinyl acetylene was separately recovered. An average total recovery of methyl vinyl acetylene and unreacted carbinol of 97% was secured, with an overall yield of the former of 41%. The net yield, based on dimethylethynylcarbinol consumed, and on the assumption that the materials boiling above methyl vinyl acetylene held 150 grams of water, was 82% of the theoretical.

The acidic alumina catalyst when freshly activated by high temperature heat treatment gives lower efficiencies during the first hour or two of use than afterwards. In the foregoing example, the rate of decomposition of the carbinol to form acetylene and acetone during the period following the first two hours was less than one-eighth of the rate thereof during the first two hours. Thus 2405 grams of dimethylethynylcarbinol in the last 11 hours yielded 718 grams of methyl vinyl acetylene, 1489 grams of residue, and 1.2 cubic feet of acetylene. This is equivalent to the decomposition of 5% of the carbinol, and an overall yield of methyl vinyl acetylene of 38% based on the carbinol treated.

*Example 3*

Methylethylethynylcarbinol was passed at a rate of 71 grams of the carbinol per liter of catalyst per hour over acidic activated alumina that had been prepared in the manner described in Example 1, and which had been preheated at 900° C. overnight. The catalyst was maintained at a temperature of 250° C., and the vapors from the catalyst chamber were condensed and the distillate fractionally distilled in the manner described in Example 1. A vinyl acetylene, which apparently is 3-methyl-pentene-2-ine-3, but conceivably may have the structure indicated by the designation 2-ethyl-bentene 1-ine-3, was obtained in a yield of 58% of the theoretical, together with unreacted carbinol. This vinyl acetylene boils at 66° to 67° C., and has an index of refraction of 25° C. of 1.4252, and a density at that temperature of 0.733.

*Example 4*

Following the procedure described in Example 3, ethynylcyclohexanol was passed over that catalyst at a rate of about 120 grams of the carbinol per liter of catalyst per hour, and at a temperature of 250° C. A yield of 47% of cyclohexenyl acetylene based on the carbinol treated was obtained, together with considerable unreacted carbinol. The former, which has a structure designated by the formula,

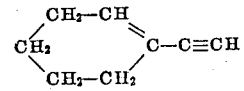

boils at 45° to 50° C. under an absolute pressure of 15 mm. of mercury.

It is within the scope of the invention to utilize as catalysts in the process aluminas of commercial grades such as commercial activated alumina, which have been leached with an acidic compound such as aluminum sulfate, or with dilute sulfuric or phosphoric acid, and which thereafter may have been washed with water or other suitable solvent to remove therefrom water-soluble salts and free acids before drying and/or highly heating the catalyst preparatory to its use.

*Example 5*

One liter of a commercial activated alumina was covered with an equal volume of a cold 15% aqueous solution of sulfuric acid and allowed to stand for 5 hours at room temperature. The alumina was then filtered, and dried at 110° C. This catalyst was then reactivated by heating overnight at 900° C.

Vapors of dimethylethynylcarbinol were passed over this catalyst, maintained at 250° C. in a glass reaction tube, at a rate of 265 grams of the carbinol per liter of catalyst per hour. The reaction products were condensed and isolated in the general manner described in Example 1. A 79% yield of methyl vinyl acetylene was obtained; and 10.5% of the original carbinol was recovered for reuse. No decomposition of the carbinol into acetylene and acetone occurred.

In the preparation of catalysts from aluminas leached or impregnated with sulfuric or phosphoric acid the alumina may be covered with a dilute aqueous solution (desirably 10 to 20% solution) of the acid, and warmed or even boiled for several hours, after which the residual solution is decanted and the catalyst dried, and/or highly heat-treated at temperatures within a range from 200° to 1000° C. The heat treatment may be preceded, if desired, by washing the digested alumina with water or water-soluble solvent to remove water-soluble components.

The neutral or slightly acidic catalysts employed with the present invention are clearly to be distinguished from the usual activated alumina catalysts, from aluminum sulfate, and from the basic aluminum sulfates containing a theoretical uncombined alumina content of around 20 to 25% or less. Indeed untreated commercial activated alumina has been found to cause a 92% decomposition of dimethylethynylcarbinol into acetylene and acetone, even at temperatures as low as 200° C., with no formation of methyl vinyl acetylene. Aluminum sulfate per se has been found to have no action upon dimethylethynylcarbinol at temperatures effective for dehydrating the said carbinol when using the digested alumina of the present invention.

The present catalysts contain a major portion of uncombined alumina and may contain small amounts of certain acidic compounds capable, in such association with alumina, of facilitating removal of the elements of water from 3-methylbutinol, its homologues and analogues, with the production of good yields of isoalkenyl acetylenes while limiting or inhibiting the decomposition of the acetylenic alcohols employed. These aluminas may contain from around 50% to around 100% of uncombined alumina. Thus, one sample of alumina impregnated with 20% of its weight of hydrated aluminum sulfate yielded the following upon analysis:

|  | Per cent |
|---|---|
| $Al_2O_3$ | 78.32 |
| FeO | 0.04 |
| $SO_3$ | 5.00 |
| $Na_2O+K_2O$ | 0.18 |
| Ignition loss | 16.40 |

In the above analysis, the values for $Na_2O$ and $K_2O$ do not indicate the actual presence of these oxides in the alumina. This is merely the conventional manner of representing the amounts of Na and K present in the alumina.

The term "a vinyl acetylene" is employed in the accompanying claims to designate vinyl acetylene per se, and also its homologues and analogues.

The invention is susceptible of modification within the scope of the appended claims.

I claim:

1. Vapor phase process of dehydrating a tertiary acetylenic carbinol, which comprises removing the elements of water from the said carbinol at a temperature within the range from around 200° C. to around 350° C., in the presence of a catalyst essentially consisting of commercial alumina that has been digested and acidified with a solution of aluminum sulfate and from which the excess solution and materials soluble therein have been removed.

2. Process for producing a vinyl acetylene, which comprises contacting a monohydric acetylenic alcohol in the vapor phase at a temperature within the range from around 150° C. to around 450° C. with a catalyst consisting of commercial alumina digested and slightly acidified with an aluminum sulfate solution.

3. Process for producing a vinyl acetylene, which comprises contacting a monohydric acetylenic alcohol in the vapor phase at an elevated temperature with a catalyst consisting of commercial alumina activated by treatment with a solution of aluminum sulfate in amount at least sufficient to neutralize any alkalinity of the alumina, which catalyst contains reaction products of said activation treatment which are soluble in said solution.

THOMAS H. VAUGHN.